US006175896B1

United States Patent
Bui

(10) Patent No.: US 6,175,896 B1
(45) Date of Patent: *Jan. 16, 2001

(54) MICROPROCESSOR SYSTEM AND METHOD FOR INCREASING MEMORY BANDWIDTH FOR DATA TRANSFERS BETWEEN A CACHE AND MAIN MEMORY UTILIZING DATA COMPRESSION

(75) Inventor: Tuan H. Bui, Phoenix, AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/944,691

(22) Filed: Oct. 6, 1997

(51) Int. Cl.[7] .............................. G06F 13/00; G06F 5/00
(52) U.S. Cl. ........................ 711/118; 710/68; 709/247; 711/123; 712/239
(58) Field of Search ..................... 711/202, 207, 711/209, 123, 118; 709/247; 710/68; 707/101; 708/203; 712/239

(56) References Cited

U.S. PATENT DOCUMENTS

| | | | |
|---|---|---|---|
| 5,450,562 | * 9/1995 | Rosenberg et al. | 711/119 |
| 5,696,927 | * 12/1997 | MacDonald et al. | 711/207 |
| 5,699,539 | * 12/1997 | Garber et al. | 711/2 |
| 5,875,454 | * 2/1999 | Craft et al. | 711/113 |
| 5,915,129 | * 6/1999 | Slivka et al. | 711/154 |

\* cited by examiner

*Primary Examiner*—Glenn Gossage
(74) *Attorney, Agent, or Firm*—Blakely, Sokoloff, Taylor & Zafman LLP

(57) ABSTRACT

A microprocessor includes a cache memory, a bus interface unit, and an execution engine. The bus interface unit is connected to the cache memory and adapted to receive compressed data from a main memory. The execution engine is connected to the bus interface unit and adapted to receive the compressed data from the bus interface unit. The execution engine decompresses the compressed data into uncompressed data and transmits the uncompressed data to the bus interface unit. The bus interface unit is further adapted to transmit the uncompressed data to the cache memory. The microprocessor may be used in a microprocessor system having a main memory capable of storing compressed data, where the bus interface unit transfers compressed data from the main memory to the cache memory in the microprocessor. A method is also provided for increasing memory bandwidth in a microprocessor system including a microprocessor having a cache memory. The method comprises receiving compressed data into the microprocessor; decompressing the compressed data into uncompressed data; and transmitting the uncompressed data to the cache memory. The method includes the handling of page boundaries between the compressed and uncompressed data.

The compressed data may comprise pages of data, and may include an index table containing address information related to the pages. The index table may define upper and lower boundary addresses for each page, and a fault condition may be generated if a requested address is not contained within the cache memory. The compressed data may also comprise encrypted compressed data, and the execution engine may decrypt and decompress the encrypted compressed data into uncompressed data.

33 Claims, 1 Drawing Sheet

MICROPROCESSOR SYSTEM AND METHOD FOR INCREASING MEMORY BANDWIDTH FOR DATA TRANSFERS BETWEEN A CACHE AND MAIN MEMORY UTILIZING DATA COMPRESSION

BACKGROUND OF THE INVENTION

1. Field of the Invention

The present invention relates generally to increasing the processing speed of a microprocessor, and more particularly to a method and apparatus for increasing memory bandwidth by compression.

2. Description of Related Art

Improvements in microprocessor design have resulted in microprocessors having high clock speeds and the ability to execute multiple instructions per clock cycle. As the processing speed of a microprocessor increases, the microprocessor requires that program instructions and data also be supplied at a higher rate to optimize the use of the microprocessor's execution resources. If the rate at which program instructions (i.e., instruction bandwidth) or data (i.e., data bandwidth) are supplied is less than the processing speed (i.e., processing bandwidth) of the microprocessor, the microprocessor must wait for the information. Such idle time degrades overall system performance because the resources of the microprocessor are not optimally utilized.

When a microprocessor requests data, it first checks its internal cache memory. Program instructions are typically stored in an instruction cache (Icache) and data is typically stored in a data cache (Dcache). Hereinafter, the term data is intended to include both program instructions stored in the Icache and data stored in the Dcache. If the requested data is present in the cache the microprocessor can retrieve it quickly (on the order of a few clock cycles). If the data is not present in the cache, the main memory is checked. If the data is present in main memory, it is retrieved but a penalty is paid for missing the cache (data is retrieved from the main memory on the order of 100's of clock cycles). If the data is not present in main memory, it must be loaded from the hard disk or other storage device, and an even greater penalty is paid (on the order of 1000's of clock cycles).

Data compression algorithms have been used to try to reduce the penalties associated with accessing data stored on the hard disk and to reduce the space required to store files on electronic media including compact disc read only memories (CD ROM's), floppy disks, and hard disks.

A known compression program provides an interface between the main memory and the hard disk in an attempt to reduce the penalties associated with accessing the hard disk for data. Pages of data are read from the hard disk, and compression is attempted. A portion of the main memory is reserved for uncompressed data. This compression increases the apparent size of the main memory. If half of the main memory is reserved for compressed data and an average compression ratio of 3:1 is achieved, the apparent size of the memory is doubled. Pages of data are moved from the compressed portion to the uncompressed portion of the main memory when requested by the microprocessor. The decompression adds overhead because the data is not directly available in the main memory, but the overhead is less than the time required to access the hard disk if the data had not been stored in the main memory at all. This compression system reduces the penalty associated with missing the main memory and having to access the hard disk, but does not address the penalty associated with missing the cache and having to access the main memory for the data.

The first order equation for central processing unit (CPU) performance is:

$$\text{Total CPU time} = (\text{Execution Latency}_{\text{perfect caches}} + \text{Memory Access Latency})$$

Execution latency is the minimum time required to execute a task if the memory subsystem can be made perfect (i.e., instructions are ready for the processor in the cache when execution resources are available). Memory latency is the additional time required to access main memory if the data is not present in the cache. Because memory bandwidth and throughput have not improved at the same rate as improvements in microprocessor instruction execution rate, the Memory Access Latency term has become a larger percentage contributor to the first order CPU performance equation.

It would be desirable to reduce the contribution of the Memory Access Latency factor to the overall CPU performance equation, thus reducing the penalty paid for missing the cache.

SUMMARY OF THE INVENTION

An aspect of the invention is seen in a microprocessor including a cache memory, a bus interface unit, and an execution engine. The bus interface unit is connected to the cache memory and adapted to receive compressed data. The execution engine is connected to the bus interface unit and adapted to receive the compressed data from the bus interface unit. The execution engine decompresses the compressed data into uncompressed data and transmits the uncompressed data to bus interface unit. The bus interface unit is further adapted to transmit the uncompressed data to the cache memory.

Another aspect of the invention is seen in a method for increasing memory bandwidth in a microprocessor system. The microprocessor system includes a microprocessor having a cache memory. The method comprises receiving compressed data into the microprocessor; decompressing the compressed data into uncompressed data; and transmitting the uncompressed data to the cache memory.

BRIEF DESCRIPTION OF THE DRAWINGS

The foregoing and other advantages of the invention will become apparent upon reading the following detailed description and upon reference to the drawings in which.

DESCRIPTION OF ILLUSTRATIVE EMBODIMENTS

The following examples are included to demonstrate preferred embodiments of the invention. It should be appreciated by those skilled in the art that the techniques disclosed in the examples that follow represent techniques discovered by the inventor to function well in the practice of the invention. However, those skilled in the art should, in light of the present disclosure, appreciate that many changes can be made in the specific embodiments disclosed herein and still obtain a like or similar result without departing from the spirit and scope of the invention.

Figure 1:
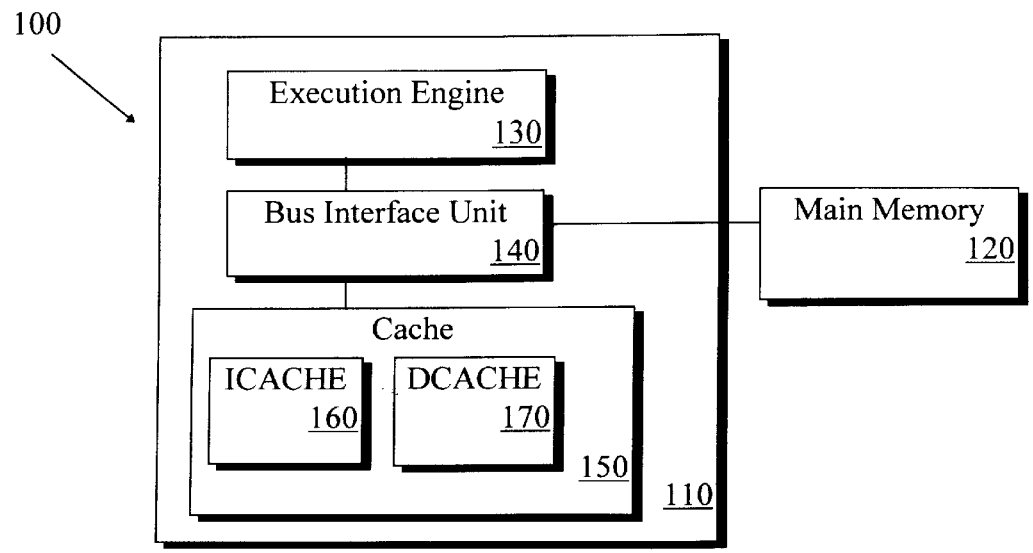
FIG. 1 illustrates a top-level block diagram of a microprocessor system interfaced with external memory.

Referring to FIG. 1, a top-level block diagram of a microprocessor system 100 is shown. Only the elements of the microprocessor system 100 necessary to illustrate the invention are shown. A microprocessor 110 is connected to a main memory 120. The microprocessor 110 includes an execution engine 130, a bus interface unit 140, and a cache memory 150. The cache memory 150 includes an instruction cache (Icache) 160 and a data cache (Dcache) 170. The microprocessor 110 may contain one or more internal and external caches, however, for illustrative purposes, only one cache 150 is described herein.

When an application program running on a computer system is activated, the operating system of the computer system interprets the application header of the application program. The application header typically indicates the resources required by the program. The operating system configures internal registers (not shown) of the microprocessor 110 and loads the main memory 120 with program instructions. The operating system also provides the microprocessor 110 with the instruction pointer (IP) representing the starting address of the first instruction of the application program. For clarity, the invention will be described with respect to a single application program. It is well known in the art that multiple application programs can be executed simultaneously by a microprocessor system 100 by sharing and allocating the resources of the microprocessor 110 and associated main memory 120.

When the microprocessor 110 starts executing the application program, the bus interface unit 140 populates the cache 150 with instructions and data required for the application program. The bus interface unit 140 typically includes a branch prediction unit that predicts which program branches the application program will take, and thereby attempts to keep the pipeline for the execution engine 130 full of the required program instructions. The bus interface unit 140 is responsible for retrieving the instructions and data required by the execution engine 130. When the execution engine 130 requests information, whether it be a program instruction or other data, the bus interface unit 140 checks the cache memory 150 to see if the information is contained within the appropriate Icache 160 or Dcache 170. If the information is not present in the cache 150, the bus interface unit 140 queries the main memory 120. If the data is present in the main memory 120, it is retrieved into the cache 150. Typically more data is retrieved into the cache 150 than is required. For example, if 4 bytes of data are requested by the execution engine 130, the bus interface unit 140 retrieves 32 bytes of data, such that if the execution engine 130 then requests the next sequential bytes, they will already have been loaded into the cache 150.

A bottleneck is present between the main memory 120 and the cache 150. The execution engine 130 must wait for data to be transferred from the main memory 120 to the cache 150, and therefore, the resources of the microprocessor 110 are underutilized during this delay. Compressing the data stored in the main memory 120 allows the data to be loaded more quickly into the cache 150. Modifying the first order CPU performance equation to include compressed data yields:

$$\text{Total CPU time} = \text{Execution Latency}_{perfect\ caches} + (1-CF)^*\text{Memory Access Latency} + \text{Overhead},$$

where CF is the compression factor and Overhead is the additional time required to decompress the data. If dedicated decompression hardware is incorporated into the microprocessor 110, the overhead can be reduced to zero. Assuming equal contributions from the execution and memory access latencies, a modest compression factor of 0.5 reduces the total CPU time by 25%. As the memory access component grows in proportion to the execution component, the benefit of code compression is more pronounced.

Figure 2:
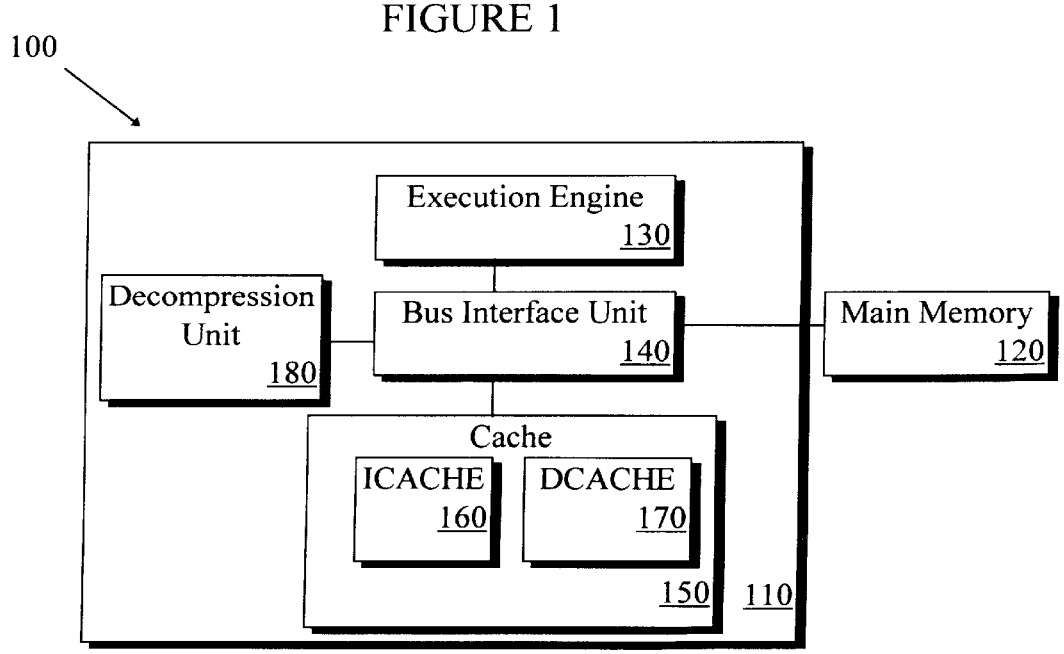
FIG. 2 illustrates a top-level block diagram of the microprocessor system of FIG. 1 including a decompression unit.

The microprocessor 110 operates in normal mode and fetches instructions out of the Icache 160. When a cache miss, context switch, or fault occurs, the current task the microprocessor 110 is executing is suspended. A decompression unit 180 (shown in FIG. 2) accesses the compressed data stored in the main memory 120. In the embodiment of FIG. 1, the resources of the execution engine 130 are used to decompress the data, and thus the execution engine functions as the decompression unit 180. The decompression unit 180, which is discussed in greater detail below, may be implemented with software (FIG. 1) or hardware (FIG. 2). The decompression unit 180 decompresses the data in the main memory 120, and the bus interface unit 140 loads it into the Icache 160. The microprocessor 110 is then switched back to the suspended task. It is contemplated that a fast context switch to the decompression unit may be used to expedite retrieval of the compressed data.

Many compression algorithms are known in the art. Compression algorithms can be lossy (i.e., some of the data is lost during the compression process) or lossless (i.e., all of the data is conserved). Certain compression formats have been developed for use with specific types of files, such as the lossy compression formats for images and for video. Lossy algorithms are used where it is more desirable to reduce the space required to store the data than to preserve every element of the original. Lossless compression algorithms are useful for compressing program instructions or data files that must be decompressed into their original form. Some lossless compression programs compress a data stream as it is being sent (e.g., data being sent through a modem is often compressed in this manner). Other compression programs analyze a set of data to identify repeating data strings. Each repeating data string is assigned a code that represents the data string. A dictionary is used to keep track of the repeating strings and their assigned codes. The compressed data consists of the dictionary and the symbols. Certain data strings may not repeat sufficiently to warrant assigning them a code, and are therefore stored uncompressed.

The specific compression algorithm chosen for compressing the data in the main memory 120 depends on factors such as storage overhead (e.g., algorithm and dictionary storage requirements), processing overhead (e.g., compression factor vs. algorithm speed), and data type considerations (i.e., different types of code and data are compressed with different efficiencies). Commonly available compression programs, such as PKZIP®, sold by PKWARE, Inc. of Brown Deer, Wis., have average compression ratios of about 0.5. Executable code for a Reduced Instruction Set Computer (RISC) can be compressed to a higher degree due to higher code expansion. Certain compilers of RISC type computer instructions produce executables having compression factors greater than 0.7.

Certain known compression programs include are adapted to encrypt and decrypt data as its being processed. It is contemplated that the compression algorithm chosen for implementation of this invention may include provisions for decrypting compressed data that is also encrypted.

In one embodiment of the invention, a portion of the cache 150 is reserved for the decompression algorithm. The decompression algorithm may be loaded by the operating system or may be contained in the data file itself, such as with self-extracting data files, also known as bootstrapped files. In self-extracting files, a first portion of the data file is uncompressed and contains the decompression algorithm. As the self-extracting program executes, it loads the decompression algorithm instructions into memory. These instructions are executed to decompress the remaining portions of the data file. Self-extracting files are useful because the compression algorithm can be tailored to the specific type of data being compressed to increase efficiency.

A typical superscalar microprocessor has between two and four integer execution units, two floating point execution units, and one to two memory execution units. These microprocessors execute instructions in parallel, and in cases where instruction level parallelism is not available, one or more of the execution units may be unused. These unused execution resources may be employed to decompress the data stored in the main memory 120 as it is transferred to the cache 150. In a microprocessor 110 with multithreading capabilities, one thread may be dedicated to the decompression unit, and the other threads my be used for program execution.

In the embodiment of FIG. 1, a portion of the cache 150 may be reserved for storage of the decompression program and dictionary, if applicable.

In the embodiment shown in FIG. 2, the microprocessor 110 includes a decompression unit 180 connected to the bus interface unit 140. The decompression unit 180 may include an execution unit (not shown) for decompressing the data retrieved from the main memory 120, or the decompression unit 180 may be a program storage device for storing the decompression algorithm, dictionary, and/or intermediate compressed and uncompressed data. In order to reduce the overhead factor of the CPU performance equation using compressed data, the decompression unit 180 may include both an execution unit (not shown) and a program storage device (not shown). The term "decompression" used herein encompasses both hardware (e.g., decompression unit 180) and software implementations.

To properly handle paging and other system related accounting, the microprocessor 110 switches modes of operation when compressed data is being handled. The mode switching between compressed and uncompressed data can be handled by the operating system. A flag in the application header signals the operating system that the data file is compressed, and the operating system may change the mode of the microprocessor 110 as the operating system shares microprocessor 110 resources among different application programs.

When the microprocessor 110 is handling uncompressed data, one line of data (e.g., 32 bytes) is typically transferred from a page in the main memory 120 into the cache 150. When handling compressed data, the number of compressed bytes corresponding to a page of data in the main memory 120 depends on the compression algorithm and the compressibility of the data.

When the data is originally compressed (e.g., during the compiling of an executable), an index table, flags or markers may be included in the compressed data file to indicate page breaks. Alternatively, the decompression unit 180 may decompress the data into a buffer and transfer only the required number of bytes to the bus interface unit 140 for adding to the cache 150.

Figure 3:
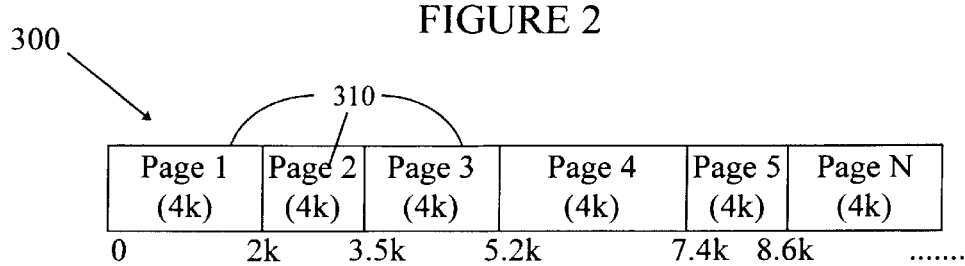
FIG. 3 illustrates a compressed data file subdivided into pages.

Certain compressed binary files have an index table that identify offsets into the compressed data space representing the start of each uncompressed physical code page to facilitate quick searching into the compressed code image for a particular code page. For example, a 1 megabyte file consists of 256 4-kilobyte pages. An index table for the binary file would then comprise 256 entries indicating the offset required to address each individual page. The size of the index table is small compared to the size of the binary file, and is easily developed during the compression process. An illustrative code segment 300 used to create an index table is shown in FIG. 3. The addresses and offsets are shown as decimal numbers for ease of understanding. An actual index table would typically have hexadecimal offsets. The code segment 300 is broken into pages 310, each page having an uncompressed size of 4 k bytes. As seen in FIG. 3, the individual pages 310 are compressed with differing compression factors (cf), due to the varying compressibility of the data within each page 310. Therefore the number of bytes a compressed page 310 requires for storage varies. For example, Page 1 is compressed into 2 k (cf: 0.5); Page 2 is compressed into 1.5 k (cf: 0.625); Page 3 is compressed into 1.7 k (cf: 0.575); Page 4 is compressed into 2.2 k (cf: 0.45); and Page 5 is compressed into 1.2 k (cf: 0.7). The index table may include the offset of each page 310 from the starting point, or the offset of each page 310 from the previous page.

The index table may be constructed during the compiling of an executable program and/or during the compressing of an already existing data file to create a compressed data file. During the compiling and/or compressing, an intermediate compressed file is generated, and the index table is constructed. When the compiling and/or compressing is complete, the index table is appended to the intermediate compressed file to generate the compressed data file.

If the compressed data file does not have an index table, a dynamic index table may be generated and tracked in the microprocessor 110 or the decompression unit 180. When decompressing a particular binary file for the first time, the offsets for the page boundaries would not be known. As the data is decompressed, the page boundaries are identified and stored in the dynamic index table. The decompression unit 180 retrieves a page of compressed data (e.g., 4 kilobytes) from the main memory 120 and decompresses the data. During the decompression, the dynamic index table would be populated with the identified page breaks.

An example method for handling compressed code in the microprocessor 110 is given below. This example is for illustrative purposes and is not to be regarded as limiting. The example is described in terms of compressed instruction data which is ultimately placed in the Icache 160, but the description is intended to also apply to data to be stored in the Dcache 170. Other methods for relating the compressed data in the main memory 120 to the uncompressed data may be used.

To execute compressed code, the cache 150 architecture does not automatically perform a line fill (i.e., fetch 32 bytes from the main memory 120) while executing compressed code. When a cache miss occurs, a fault is generated and an appropriate fault handler in the microprocessor 110 is invoked to resolve the cache miss. The cache 150 is managed by either the fault handler or the decompression process. If the microprocessor 110 were simultaneously executing a program containing compressed code and program containing uncompressed code, the cache may be split with a portion being reserved for the uncompressed program. Cache population and replacement algorithms typically associated with uncompressed code may pollute the data related to the compressed code. Reserving a portion of the cache for the compressed code program helps ensure the integrity of the uncompressed code and reduce the number of times the main memory 120 is accessed to fetch compressed code, In a normal mode of operation, because instructions and data are prefetched into the cache 150, the decompression process will be ahead of the actual execution of the code, and accordingly, the required instructions are present in the cache 150 when required by the microprocessor 110.

If the decompression process falls behind the executing code or the executing instruction stream experiences a taken branch, a cache miss will occur and the fault handler will be invoked. Within the fault handler, a determination is made whether the instruction causing the cache miss resides within a) the current uncompressed physical code page address boundaries or b) different uncompressed physical code page address boundaries. To make this differentiation, a hardware or software mechanism keeps track of the current uncompressed instruction address and where it is relative to the current code page boundary addresses.

The fault handler compares the uncompressed instruction address with the address that caused the cache miss. If the missed address is larger than the current uncompressed instruction address, and it is within the upper boundary address of the current page, then the decompression process is lagging the execution and the fault handler can wait until the decompression process catches up and the missed address matches the current uncompressed address. If the missed address is larger than the current uncompressed instruction address and it is outside of the current page boundary addresses, then it is likely that the execution program has taken a branch.

For the case where the current compressed page will not encompass the missed uncompressed instruction address or the uncompressed instruction address is less than the lower boundary address of the current uncompressed page (e.g., as may be caused by a backward branch), then the decompression process is stopped, and the index table is consulted to identify the new compressed physical page to be brought into the processor. The decompression is restarted at some known starting point in the new compressed physical page. If the index table does not contain an entry which identifies the offset of the requested address, as is possible with a dynamic index table, the decompression process may continue from the nearest known boundary address until the required address is encountered. The dynamic index table may then be populated with the proper offset for the particular page.

While the invention is susceptible to various modifications and alternative forms, specific embodiments have been shown by way of example in the drawings and have been described in detail herein. However, it should be understood that the invention is not intended to be limited to the particular forms disclosed. It will be appreciated by those of ordinary skill having the benefit of this disclosure that numerous variations from the foregoing illustrations will be possible without departing from the inventive concept described herein. Accordingly, it is the claims set forth below, and not merely the foregoing illustration, which are intended to define the exclusive rights claimed in this application.

What is claimed is:

1. A microprocessor, comprising:
    a cache memory;
    a bus interface unit connected to the cache memory to receive compressed data from a main memory, transmit uncompressed data to the cache memory, and predict which program branches an application program will take;
    an execution engine connected to the bus interface unit to receive the compressed data from the bus interface unit, decompress the compressed data into the uncompressed data, and transmit the uncompressed data to the bus interface unit.

2. The microprocessor of claim 1, further comprising:
    a decompression unit including the execution engine.

3. The microprocessor of claim 1, wherein the compressed data comprises pages of data, and the compressed data includes an index table containing address information related to the pages.

4. The microprocessor of claim 1, further comprising:
    a decompression unit, wherein the compressed data comprises pages of data and the decompression unit contains an index table containing address information related to the pages.

5. The microprocessor of claim 1, the cache memory including an instruction cache, the compressed data including compressed program instructions, the execution engine to decompress the compressed program instructions into uncompressed program instructions and transmit the uncompressed program instructions to the instruction cache.

6. The microprocessor of claim 1, the cache memory including a data cache, the execution engine to transmit at least a portion of the uncompressed data to the data cache.

7. The microprocessor of claim 1, wherein the compressed data comprises encrypted compressed data, and the execution engine is for decrypting and decompressing the encrypted compressed data into uncompressed data.

8. The microprocessor of claim 1, further comprising:
    a program storage device connected to the execution engine and containing program instructions which when executed decompress the compressed data into uncompressed data.

9. The microprocessor of claim 8, wherein the program storage device comprises a reserved portion of the cache memory.

10. The microprocessor of claim 8, further comprising:
    a decompression unit including the program storage device.

11. A microprocessor system, comprising:
    a main memory;
    a microprocessor, the microprocessor including:
        a cache memory;
        a bus interface unit connected to the cache memory to receive compressed data from the main memory, transmit uncompressed data to the cache memory, and predict which program branches an application program will take;
        an execution engine connected to the bus interface unit to receive the compressed data from the bus interface unit, decompress the compressed data into the uncompressed data, and transmit the uncompressed data to the bus interface unit.

12. The microprocessor system of claim 11, further comprising:
    a decompression unit including the execution engine.

13. The microprocessor system of claim 11, wherein the compressed data comprises pages of data, and the compressed data includes an index table containing address information related to the pages.

14. The microprocessor system of claim 11, further comprising:
    a decompression unit, wherein the compressed data comprises pages of data and the decompression unit contains an index table containing address information related to the pages.

15. The microprocessor system of claim 11, the cache memory including an instruction cache, the compressed data including compressed program instructions, wherein the execution engine decompresses the compressed program instructions into uncompressed program instructions and transmits the uncompressed program instructions to the instruction cache.

16. The microprocessor system of claim 11, the cache memory including a data cache, wherein the execution engine transmits at least a portion of the uncompressed data to the data cache.

17. The microprocessor system of claim 11, wherein the compressed data comprises encrypted compressed data, and the execution engine is for decrypting and decompressing the encrypted compressed data into uncompressed data.

18. The microprocessor system of claim 11, further comprising:
   a program storage device connected to the execution engine and containing program instructions which when executed decompress the compressed data into uncompressed data.

19. The microprocessor system of claim 18, wherein the program storage device comprises a reserved portion of the cache memory.

20. The microprocessor system of claim 18, further comprising:
   a decompression unit including the program storage device.

21. A method for increasing memory bandwidth in a microprocessor system, the method comprising:
   providing a microprocessor system having a cache memory coupled to a main memory through a bus interface unit;
   receiving compressed data in the bus interface unit from the main memory;
   transmitting the compressed data from the bus interface unit to an execution engine;
   decompressing the compressed data into uncompressed data by the execution engine;
   transmitting the uncompressed data from the execution engine to the bus interface unit; and
   transmitting the uncompressed data from the bus interface unit to the cache memory.

22. The method of claim 21, further comprising:
   subdividing the uncompressed data into pages of uncompressed data, each page having a predetermined number of data elements; and
   generating an index table indicating locations of each page of uncompressed data within a compressed data file.

23. The method of claim 21, wherein the compressed data comprises encrypted compressed data, wherein the decompressing includes decrypting and decompressing the encrypted compressed data into uncompressed data.

24. The method of claim 21, wherein the bus interface unit contains a branch prediction unit.

25. The method of claim 21, further comprising:
   providing a compressed data file,
   wherein receiving compressed data comprises receiving at least a portion of the compressed data file.

26. The method of claim 25, further comprising:
   appending a set of program instructions to the compressed data file, the program instructions defining a decompression algorithm.

27. The method of claim 26, further comprising:
   storing the decompression algorithm in the microprocessor.

28. The method of claim 27, wherein storing includes storing the decompression algorithm in a reserved portion of the cache memory.

29. The method of claim 27, the microprocessor including a decompression unit, wherein storing includes storing the decompression algorithm in the decompression unit.

30. A method for increasing memory bandwidth in a microprocessor system, the method comprising:
   receiving compressed data from a main memory;
   decompressing the compressed data into uncompressed data;
   transmitting the uncompressed data to a cache memory;
   subdividing the uncompressed data into pages of uncompressed data, each page having a predetermined number of data elements;
   generating an index table indicating locations of each page of uncompressed data within a compressed data file and defining a lower boundary address and an upper boundary address for each page;
   locating data stored at an address requested by the microprocessor;
   generating a fault condition if the requested address is not contained within the cache memory; and
   in response to a fault condition:
      comparing the requested address to the upper and lower boundary addresses of a current page to identify if the requested address is contained within the current page;
      if the requested address is contained within the current page then periodically checking if the requested address is contained within the cache memory; and
      if the requested address is not contained within the current page then referencing the index table to identify the location of the page containing the requested address within the compressed data file and receiving the compressed data containing the identified page into the microprocessor.

31. A method for increasing memory bandwidth in a microprocessor system, the method comprising:
   providing a compressed data file by:
      subdividing a data file into pages of uncompressed data, each page having a predetermined number of data elements;
      compressing the data file into an intermediate compressed data file;
      building an index table indicating locations of each page of uncompressed data within the intermediate compressed data file; and
      appending the index table to the intermediate compressed data file to generate the compressed data file;
   receiving compressed data containing at least a portion of the compressed data file from a main memory;
   decompressing the compressed data into decompressed data; and
   transmitting the decompressed data to a cache memory.

32. The method of claim 31, the data file containing program instructions, wherein subdividing, compressing, building, and appending are conducted during the compiling of the data file to generate an executable data file.

33. The method of claim 31, the index table defining a lower boundary address and an upper boundary address for each page, the method further comprising:
   locating data stored at an address requested by the microprocessor;
   generating a fault condition if the requested address is not contained within the cache memory; and in response to a fault condition:
  comparing the requested address to the upper and lower boundary addresses of a current page to identify if the requested address is contained within the current page;
  if the requested address is contained within the current page then periodically checking if the requested address is contained within the cache memory; and
  if the requested address is not contained within the current page then referencing the index table to identify the location of the page containing the requested address within the compressed data file and receiving the compressed data containing the identified page into the microprocessor.

* * * * *